May 23, 1944.   H. ROSENTHAL   2,349,562
SOLVENT RECOVERY FROM COLLOIDED MATERIAL
Filed July 2, 1941
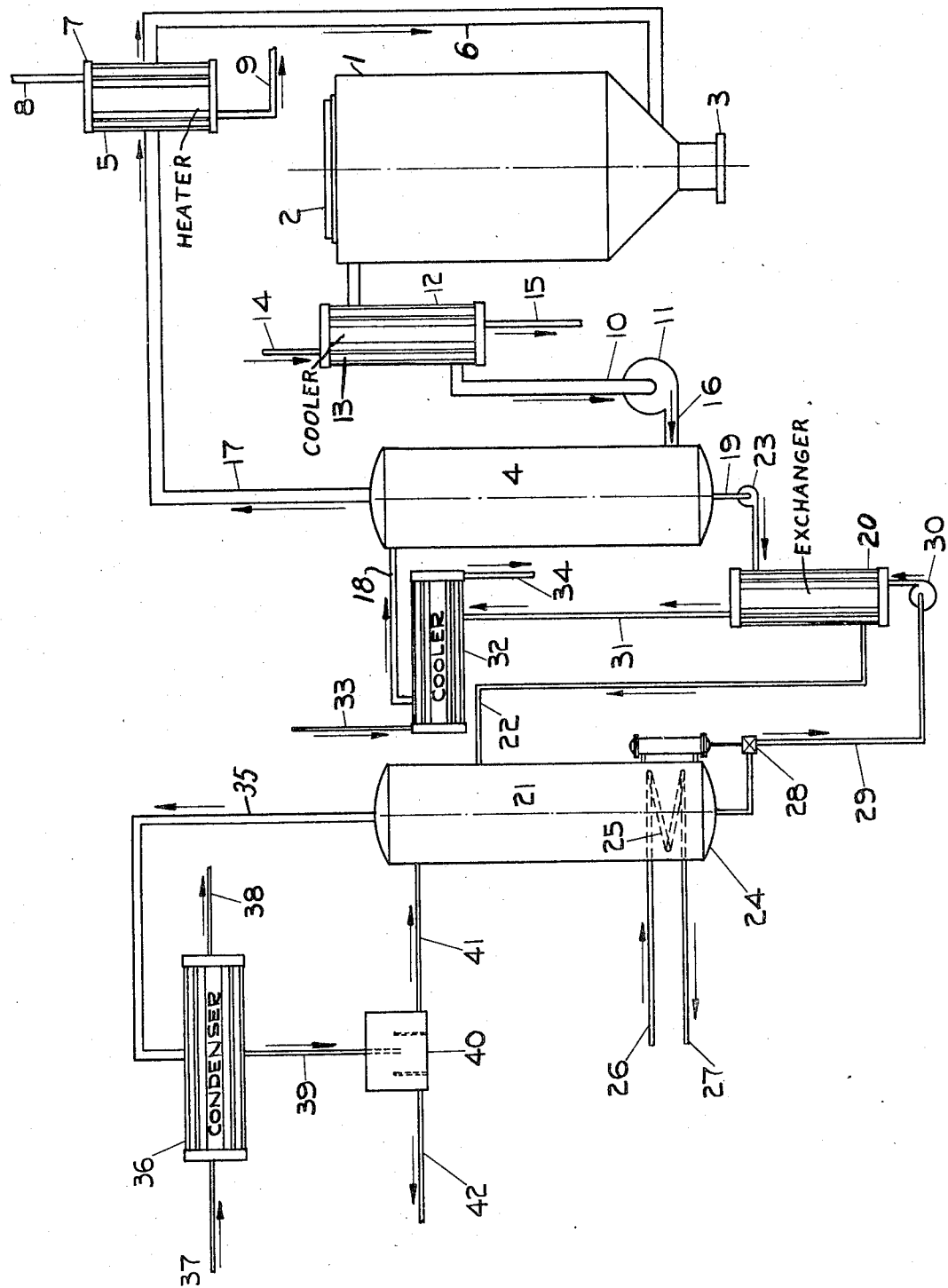
INVENTOR.
Henry Rosenthal Patented May 23, 1944

2,349,562

UNITED STATES PATENT OFFICE 2,349,562

SOLVENT RECOVERY FROM COLLOIDED MATERIAL

Henry Rosenthal, Yonkers, N. Y.

Application July 2, 1941, Serial No. 400,869

6 Claims. (Cl. 34—32)

My invention relates to the recovery of solvent, and more particularly to recovery of solvent which it is necessary to remove from the colloided material produced in the manufacture of colloided substituted celluloses and addition products of cellulose, of which an example is smokeless powder.

While I do not limit my invention in its application to the manufacture of smokeless powder, I can best describe my invention in connection with the manufacture of smokeless powder.

Smokeless powder comprises various nitrogen compounds of cellulose, compounded with small amounts of other materials, and the mixture then formed into a colloid with the addition of ether and alcohol as a solvent. After the colloid has been prepared with the proper addition of the solvent, the colloid is formed into the desired shapes, either by forcing the colloid through a die, or by rolling it into sheets. The powder thus formed is cut into pieces of the proper length.

The powder as it comes from the cutter contains a considerable amount of ether-alcohol solvent which must be removed. Hence, the powder is next subjected to a drying treatment for the purpose of removing the solvent from the powder grain. This drying process is important in producing a uniform finished product, and includes recovery of a portion of the ether and alcohol solvent. The initial process in drying the powder is thus one of solvent recovery.

The procedure most widely followed at present, comprises circulating warm air through the powder and then forcing the air over cold coils. This change in temperature causes a precipitation of the solvent upon the coils, and produces a fog of condensed solvent. The saturated air, after passing over these cold coils, loses its surplus solvent, is reheated, and then is again forced through the powder in a continuous cycle, in this manner completing the closed system of air circulation. The temperature of heating in the solvent recovery process, varies from 25° C. to 65° C., depending on the size of the powder and the length of time the powder has been subjected to treatment in the solvent recovery process.

In order for this process to be effective, the air must be reduced to extremely low temperatures by being blown over extremely cold coils. The temperatures maintained in the coils is thus in the range from —15° C. to —25° C. Not only does the maintenance of low temperatures of this magnitude involve the use of very expensive machinery, both as considering first cost and operating expenses, but also it involves a considerable expenditure for reheating the air to the proper temperature for recycling through the powder. Moreover, this chilling method is relatively inefficient as a means of removing the solvent, unless the air is refrigerated to an almost impractical degree. Therefore, the process requires a greater circulation of air than would be required if a more efficient method were employed for removal of solvent from the solvent laden air.

In order to obviate some of the disadvantages of the above described process, the use of activated carbon for absorption of the solvent vapors has been used to some extent. While this process has certain advantages as compared with the older and more common process described above, it has certain inherent defects. It is a cyclic process conducted on a batch basis and therefore expensive and complicated to operate. It requires the use of large vessels containing large amounts of a relatively expensive material, namely, activated carbon. It is therefore expensive to install and requires a relatively large area for its installation. The process, however, efficiently removes and recovers the solvent, if the process is properly installed and operated.

My invention provides a system having an efficiency of operation comparable with that of the charcoal absorption system, and which also combines the advantages of continuous operation as contrasted with the batch charcoal system. My invention also provides low first cost, low operating cost, and small space requirements for its installation. These advantages I secure by the use of a suitable liquid absorbent for the removal of the solvent. I am aware that liquid solvent absorbers have been used in the petroleum and related arts, but until my invention, they have not been suitable for use in recovering solvent from a colloidal cellulose compound such as smokeless powder. This is due to the special requirements of the liquid absorbent for this purpose. Thus in the manufacture of smokeless powder, for example, the absorbent liquid must have the following properties:

1. It must be miscible with alcohol in all proportions.

2. It must be miscible with ether in all proportions.

3. It must have a relatively high boiling point, i. e., its vapor pressure must be relatively low. Preferably the boiling point of the absorbent liquid should be at least 100° C. in excess of the boiling point of the least volatile solvent used in the colloiding process.

4. It must be of a nature that small amounts of it will not contaminate the smokeless powder by its presence, either in the recirculated air or in the recovered solvent.

This last requirement is of extreme importance, as any process for this purpose would be valueless if the main product, smokeless powder, in this example, were, in any way, deteriorated. I have found that any of certain of the materials used in the compounding of smokeless powder, may be used as a liquid absorption medium for the solvent recovery process; and will meet the first three requirements. As these materials are used in the compounding of the smokeless powder, the relatively small amounts that would be introduced with the recirculated air or the recovered solvent, would not in any way deteriorate the smokeless powder. The fourth requirement above would, therefore, also be met.

As an example of a suitable liquid absorption medium, for use in the solvent recovery from smokeless powder, I prefer to use the aliphatic phthalates, such as dibutyl phthalate, or diethylphthalate; and I prefer the dibutyl phthalate to the diethylphthalate.

Dibutylphthalate is soluble in ether and alcohol in all proportions; it has a boiling point of approximately 340° C., and is used in smokeless powder as a plasticizer and for other purposes.

Diethylphthalate has similar properties to the above, except that its boiling point is approximately 300° C.

My invention is thus broadly to provide a liquid absorption system for the recovery of solvent from a colloided converted cellulose compound in which the absorption medium 1 is miscible with the colloiding solvent in all proportions.

2 has a relatively low vapor pressure.

3 is of a nature that small portions of the medium will not contaminate the colloid; or is a chemical compound that is a normal ingredient in the colloid.

The objects of my invention are thus:

1. To provide an absorption system for solvent recovery that is efficient, economical to install, economical to operate, and requires small space for installation.

2. To provide a suitable liquid absorbent, that is an efficient absorption medium for the solvent and will not contaminate the product.

Other objects of my invention are apparent from this specification.

The operation of my invention is best described with reference to the accompanying drawing which forms a part of this specification.

The figure is a schematic diagram of my invention as applied to the recovery of solvent in the manufacture of smokeless powder.

In this figure, the receptacle 1 is provided for receiving smokeless powder from the cutter. This receptacle is provided with the sealed inlet 2 and the sealed outlet 3. The smokeless powder may be supported in the receptacle in any suitable manner as is well known in the art.

Air from the absorber 4 is delivered through the heater 5 to the bottom of the receptacle 1 by means of the conduit 6.

Heater 5 is provided with the coil 7, having the inlet pipe 8, and the outlet pipe 9, for the heating medium, which may be steam, or hot water or any other suitable medium. The flow of heating medium to the coil 7 may be controlled in any well known manner for maintaining the air leaving the heater 5 at a suitable temperature for delivery to the receptacle 1. If steam is used as a heating medium, outlet pipe 9 is provided with a trap (not shown) for removal of the condensed steam in a well known manner.

The heated air, entering the receptacle 1 by conduit 6, passes upwardly through the powder, during which passage the air removes portions of the solvent from the powder. This removal of solvent by the air, lowers the temperature of the air. The solvent laden air is then withdrawn from receptacle 1 through the conduit 10 by means of the blower 11.

The cooler 12 may be interposed in the conduit 10 between the receptacle 1 and the blower 11, if the reduction in temperature of the air due to the evaporation of solvent in receptacle 1 is not sufficient for efficient absorption in the absorber 4. The cooler 12 is provided with the cooling coils 13, having the inlet 14 and the outlet 15 for the cooling medium. Cold water is a suitable cooling medium, as the usual temperature for delivery of the vapor-laden air to the absorber 4 is between 15° C. and 20° C. A suitable valve (not shown) may be provided for controlling the flow of cooling medium to the coil 13. When smokeless powder is first introduced into the receptacle 1, the cooling effect of the evaporating solvent will usually be sufficient that no further cooling of the air in the cooler 12 will be necessary. However, as the drying proceeds, and the amount of solvent removed, diminishes, and as the temperature of the air introduced through the conduit 6 increases, cooling of the air to the absorber 4 by means of the cooler 12 may be necessary.

Absorber 4 is any well known type and may be of the packed, slat, or bubble tray type. I prefer the use of the latter type. The solvent laden air enters the absorber 4, through the conduit 16, passes upwardly through the absorber and out of the top of the absorber through the conduit 17, through which it is delivered to the heater 5, which completes the cycle of the air.

In its passage through the absorber 1, the upwardly directed air contacts with a flow of downwardly directed cooled dibutylphthalate, entering the absorber through the pipe 18. This flow of dibutylphthalate absorbs substantially all of the ether and alcohol vapors from the air.

The solution of solvents and dibutylphthalate leaves the absorber 4 by the pipe 19, through the heat exchanger 20, and enters the stripping still 21 by means of the pipe 22. The pump 23 serves to force the solution from the absorber 4 through the exchanger 20 to the still 21. The purpose of the exchanger 20 will be more fully explained later.

The stripping still 21 may be of any well-known type, but I prefer to use a type known as a bubble cap fractionating tower. The solution, entering the still 21 at some point between the middle and the top thereof, passes downwardly until it reaches the boiler section 24 at the base of the still. Boiler section 24 is provided with the heating coil 25 which is supplied with a suitable heating medium through pipe 26, and which is withdrawn through pipe 27. Steam at a pressure of about 5 pounds per square inch gauge will usually be a suitable heating medium. However, other steam pressures may be used, and other heating media may be utilized, depending upon the particular adaptation of my invention. If steam is used as the heating medium, a suitable trap (not shown) may be provided in any well known manner for controlling the flow of condensate.

The dibutylphthalate, stripped of ether and alcohol, is withdrawn from the bottom of the still through any well-known type of liquid level device 28. The material so withdrawn is delivered by pipe 29 to pump 30, which, in turn forces it to the heat exchanger 26. Here the heated dibutylphthalate from the boiler 24 is cooled by heat exchange with the solution from the absorber 4; and the solution from the absorber 4 is consequently preheated before its delivery to the still 21.

The partially cooled dibutylphthalate from the exchanger 20 is delivered by pipe 31 to the cooler 32 where it is cooled to a suitable temperature for delivery to the top of the absorber 4. Cooler 32 is provided with an inlet pipe 33 and an outlet pipe 34 for cooling medium, which is preferably cold water. This water may generally be at a temperature of between 15° C. and 20° C. The control of flow of the cooling medium may be by any well known means.

The delivery of the stripped, cooled, dibutylphthalate to the absorber 4 from the cooler 32 completes the cycle of the liquid absorption medium.

Solvent vapor driven off of the solution in the still 21, leaves the still through the conduit 35 at the top of the still. This conduit leads the vapors to the condenser 36 where they are condensed by means of cold water entering the condenser tubes through pipe 37 and leaving through pipe 38. Here the vapors are condensed, and the condensate is withdrawn through the pipe 39 to the dividing box 40. Here the flow of condensate is split, a portion being returned to the still 21 as reflux through pipe 41, and the remainder, being recovered solvent which is withdrawn to any suitable location for re-use in the colloiding process or for any other suitable purpose.

It will be understood that inert gases, such as nitrogen, boiler flue gas, and similar material, may be substituted in place of air as the drying medium for removing the solvent vapors from the smokeless powder and carrying said vapors to the absorber. Such substitution of an inert gas for air would add appreciably to the safety of the process, as there would be no possibility of an explosive mixture being formed with the solvent vapors, as may be formed when air is used as the drying medium, either in the present process or in the processes known to the art. I believe that the substitution of inert gases for air as a circulating medium is broadly new in the solvent recovery step of smokeless powder manufacture. In the appended claims, wherever air is used in a claim inert gas may be substituted without departing from the meaning of the claims.

It will be further understood that many changes may be made in the details of my invention, without departing from the spirit of my invention.

Now, having described my invention in a manner that it may be readily understood by one skilled in the art, I claim:

1. The method of solvent recovery in the manufacture of a product which is a colloided substance, said substance being colloided by means of a volatile solvent, and containing a liquid plasticizer having a boiling point of at least 100° C. in excess of the boiling point of the least volatile component of said volatile solvent, said volatile solvent being also readily soluble in said plasticizer, said method comprising passing a gaseous medium in contact with said colloided substance in a container whereby said gaseous medium becomes laden with vapors of said volatile solvent, removing said vapor laden gaseous medium from contact with said colloided substance, bringing said vapor laden gaseous medium into contact with a second portion of said liquid plasticizing liquid in a second container to absorb the vapors of said volatile solvent borne by said gaseous medium, removing said gaseous medium from contact with said liquid in said second container and returning said gaseous medium into contact with said colloided substance in said first named container.

2. The method of solvent recovery in the manufacture of a product which is a colloided substance, said substance being colloided by means of a volatile solvent, and containing an aliphatic phthalate as a plasticizer, said method comprising passing a gaseous medium in contact with said colloided substance in a container whereby said gaseous medium becomes laden with vapors of said volatile solvent, removing said vapor laden gaseous medium from contact with said colloided substance, bringing said vapor laden gaseous medium into contact with a liquid aliphatic phthalate in a second container to absorb the vapors of said volatile solvent borne by said gaseous medium, and removing said gaseous medium from contact with said liquid and returning said gaseous medium into contact with said colloided substance in said first named container.

3. The method of solvent recovery in the manufacture of a product which is a colloided substance, said substance being colloided by means of a volatile solvent, and containing dibutyl phthalate as a plasticizer, said method comprising passing a gaseous medium in contact with said colloided substance in a container whereby said gaseous medium becomes laden with vapors of said volatile solvent, removing said vapor laden gaseous medium from contact with said colloided substance, bringing said vapor laden gaseous medium into contact with liquid dibutyl phthalate in a second container to absorb the vapors of said volatile solvent borne by said gaseous medium, and removing said gaseous medium from contact with said liquid and returning said gaseous medium into contact with said colloided substance in said first named container.

4. The method of solvent recovery in the manufacture of a product which is a colloided substance, said substance being colloided by means of a volatile solvent, and containing diethyl phthalate as a plasticizer, said method comprising passing a gaseous medium in contact with said colloided substance in a container whereby said gaseous medium becomes laden with vapors of said volatile solvent, removing said vapor laden gaseous medium from contact with said colloided substance, bringing said vapor laden gaseous medium into contact with liquid diethyl phthalate in a second container to absorb the vapors of said volatile solvent borne by said gaseous medium, and removing said gaseous medium from contact with said liquid and returning said gaseous medium into contact with said colloided substance in said first named container.

5. The method of solvent recovery in the manufacture of smokeless powder colloided by means of a volatile solvent, and containing a liquid plasticizer having a boiling point of at least 100° C. in excess of the boiling point of the least volatile component of said volatile solvent, said volatile solvent being also readily soluble in said plasticizer, said method comprising passing a gaseous medium in contact with said smokeless powder in a container whereby said gaseous medium becomes laden with vapors of said volatile solvent, removing said vapor laden gaseous medium from contact with said smokeless powder, bringing said vapor laden gaseous medium into contact with a second portion of said liquid plasticizing liquid in a second container to absorb the vapors of said volatile solvent borne by said gaseous medium, removing said gaseous medium from contact with said liquid in said second container and returning said gaseous medium into contact with said smokeless powder in said first named container.

6. The method of solvent recovery in the manufacture of smokeless powder colloided by means of a volatile solvent, and containing an aliphatic phthalate as a plasticizer, said method comprising passing a gaseous medium in contact with said smokeless powder in a container whereby said gaseous medium becomes laden with vapors of said volatile solvent, removing said vapor laden gaseous medium from contact with said smokeless powder, bringing said vapor laden gaseous medium into contact with a liquid aliphatic phthalate in a second container to absorb the vapors of said volatile solvent borne by said gaseous medium, and removing said gaseous medium from contact with said liquid and returning said gaseous medium into contact with said smokeless powder in said first named container.

HENRY ROSENTHAL.